Figure 1:
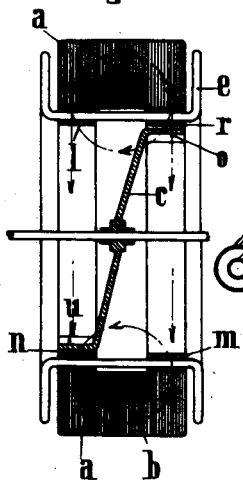

E. BECKMANN.
APPARATUS FOR TRANSMITTING MOVEMENTS OR POSITIONS OF INDEXES BY MEANS OF MULTIPHASE WOUND BODIES.
APPLICATION FILED JAN. 14, 1913.

1,211,050.

Patented Jan. 2, 1917.

Witnesses:
C. E. Parsons
H. L. Alden

Inventor:
Erich Beckmann

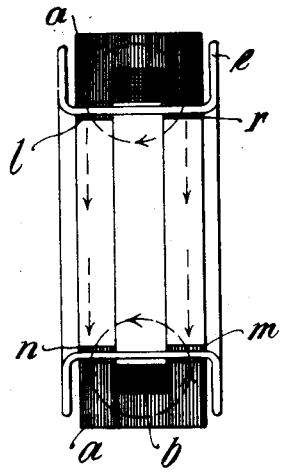
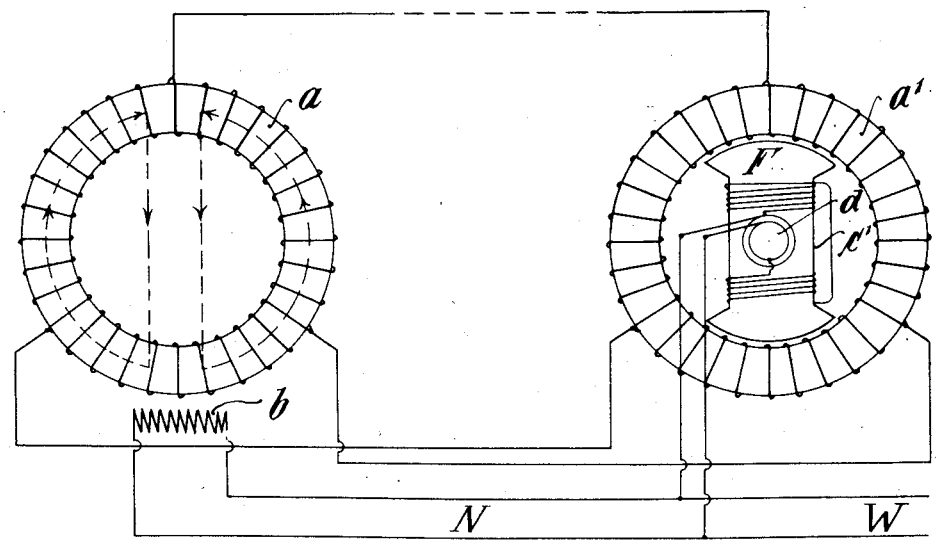

UNITED STATES PATENT OFFICE.

ERICH BECKMANN, OF HANOVER, GERMANY.

APPARATUS FOR TRANSMITTING MOVEMENTS OR POSITIONS OF INDEXES BY MEANS OF MULTIPHASE-WOUND BODIES.

1,211,050. Specification of Letters Patent. Patented Jan. 2, 1917.

Application filed January 14, 1913. Serial No. 742,009.

*To all whom it may concern:*

Be it known that I, ERICH BECKMANN, a citizen of the Empire of Germany, residing at Oeltzenstrasse 19, Hanover, Germany, have invented new and useful Improvements in Apparatus for Transmitting Movements or Positions of Indexes by Means of Multiphase-Wound Bodies, of which the following is a specification.

My invention relates to apparatus for transmitting the movements imparted to objects, e. g. for transmitting signals, wherein members, e. g. annular cores, wound with multiphase windings serve as the transmitting and receiving devices. As is well known, when two or more such cores are similarly wound with multiphase, two-pole windings and are connected together by a multiphase network of lines, it is immaterial which of these cores is employed as the transmitting device. When one of these cores is magnetized by means of a primary coil or an electromagnet energized with single-phase alternating current, magnetizing currents will flow from the winding of this core to the windings of the other cores, and the distribution of these currents will be such that the positions of the alternating current fields produced in these other cores correspond to the position of the field in the core serving as the transmitting device. When the said primary coil or electromagnet, which constitutes the exciting member, is arranged to be movable relatively to the transmitting core, the position of the field both in the transmitting and in the receiving cores will correspond to the adjustment given to this exciting member. If now a short-circuited coil is mounted to rotate within any of the receiving cores, it will tend, as is well known, so to adjust itself that its axis is at right-angles to the direction of the alternating field; for in this position the resultant of the forces acting on the coil will be zero. This short-circuited coil therefore obviously has two positions of rest, or settling positions, for each position of the alternating magnetic field and hence, should this coil carry an indicating device, e. g. for signaling purposes, the said device will have two positions for every position of the magnetic field in the receiving and in the transmitting core, and consequently of the movable exciting coil in the latter. As this exciting coil serves as the transmitter or sender, the indicating device could not be depended on always correctly to correspond to the movements of the sender, but might take up either one of two different positions. To overcome this difficulty, it has been proposed to mount an inner annular core within the receiving core, this inner core being of U-section and carrying a special winding. The latter so distorts the field that in each annular half of the gap between the cores, the field has only one maximum and only one minimum, and not two maxima and two minima as is normally the case. A short-circuited coil movable in only one annular half of the gap tends therefore to take up but one position. Owing to the large moment of inertia of the short-circuited coil and also to the troublesome work involved in fitting the inner core into its place, this arrangement is, however, more or less impractical.

A primary object of my invention is to obviate the above defects, and to this end I make the receiving core, i. e. the core which carries the multiphase winding, of U-section with the channel formed by the U opening in the direction of the movable indicating member. By arranging and energizing the multiphase winding itself in a special manner or by providing an auxiliary exciting or polarizing winding in the channel formed by the U, I so distort or modify the field that at the pole-face of each half of the U-shaped core a field is produced having only one maximum value. By mounting a rotatable Z-shaped soft-iron member so that the upper limb of the Z is acted upon by one half of the U and the lower limb by the other half, this member will tend to settle in only one position, i. e. in the position in which it joins the point of maximum intensity in one half of the U with the diagonally opposite point of maximum intensity in the other half of the U.

My improved device has the advantage of simpler construction of the magnetic circuit and of the distorting or polarizing coil. In addition, the movable member can be more readily fitted into position.

To these ends, my invention consists in the construction, combination and arrangement of parts described hereinafter and pointed out in the claims.

Some illustrative embodiments of my invention are diagrammatically represented by way of example in the accompanying drawings, wherein:—

Figure 2:
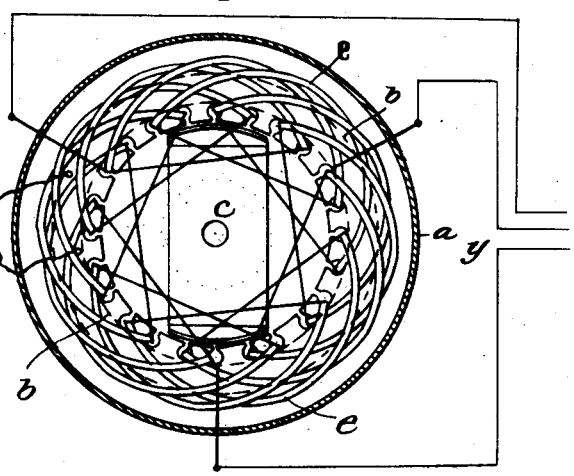
Figure 3:
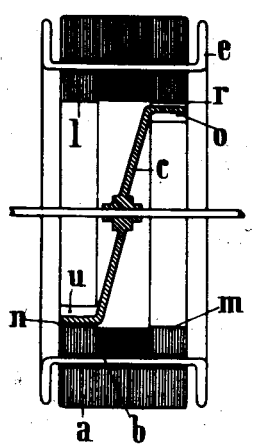

Figure 1 is a diametral section showing one form of my device, and Fig. 2 a side elevation thereof; Fig. 3 is a diametral section through a second form of my device, and Fig. 4 a side elevation thereof; Fig. 5 is a diagram of connections explanatory of the transmission system and of various systems of winding which I may employ; and Fig. 6 is a view similar to that in Fig. 1 but with the movable member omitted, and shows the direction of the lines of force under circumstances explained hereinafter, and Fig. 7 is a diagram of connection showing the manner in which currents are transmitted from the sending to the receiving apparatus.

Figure 4:
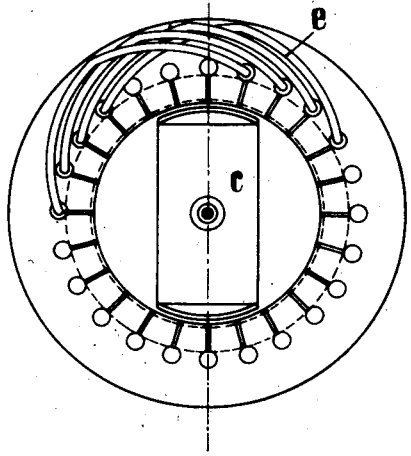
Figure 5:
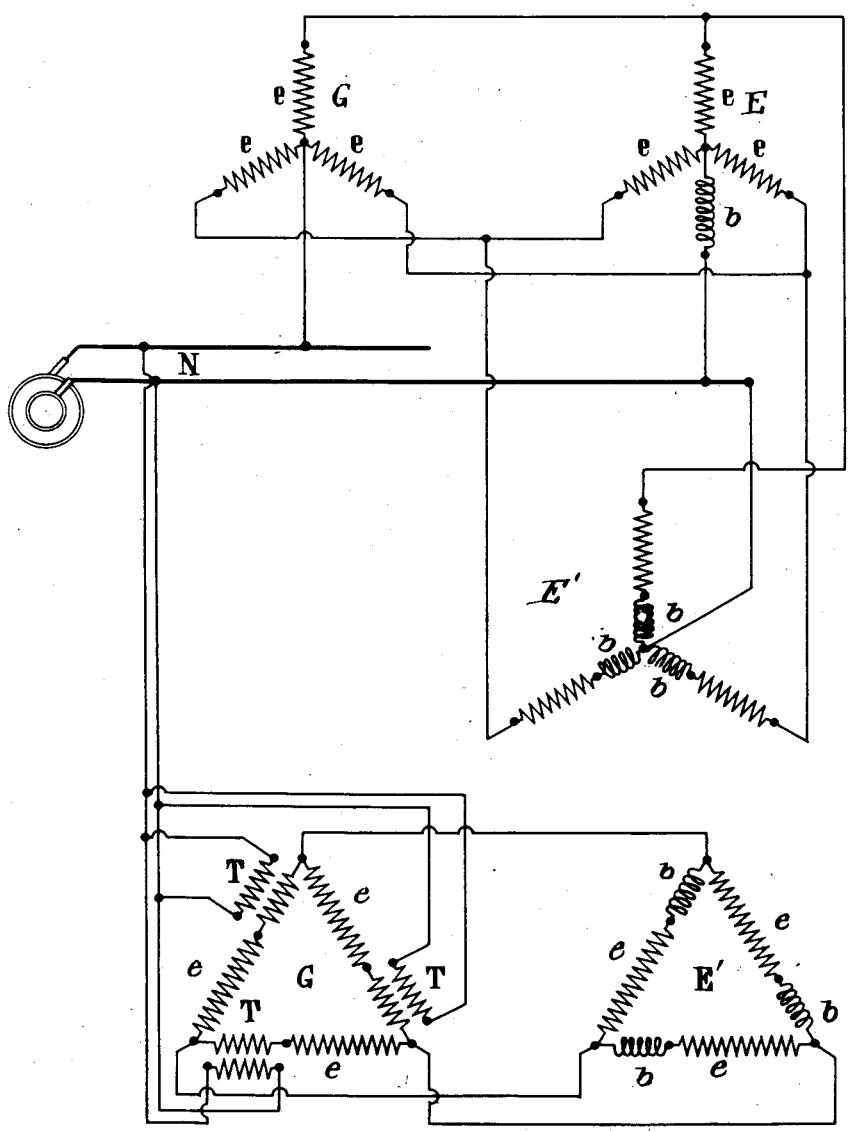

Referring first to Figs. 1, 2, 3, 4, 6, 7, the receiving core $a$ carries a multiphase winding $e$. This winding $e$ is connected at three points 120° apart (see Figs. 2 and 4) with the wires $y$ from the sender. The said core has the shape of a ring of U-section and the annular channel thus formed contains a coaxial winding $b$, which is connected to a single phase alternating-current system N. This winding may be arranged either outside the multiphase winding $e$ (Figs. 1 and 2) or within it (Figs. 3 and 4). In the bore of the said core is arranged a freely rotatable Z-shaped member or rotor $c$ made of soft iron.

The connections between a transmitter G and a receiver E are shown diagrammatically in Fig. 7. The transmitter may, for example, be operatively connected to the signaling device on the bridge of a ship. Within the multiphase wound iron ring $a'$ is rotatably mounted the electromagnet $c'$ whose winding is connected to an alternating-current system N. The magnetic field induced in the ring $a'$ will vary according to the position given to the magnet $c'$ and the currents so produced are transmitted through the wires to the ring or annular core $a$ of the receiver. It will be first assumed that the ring $a$ of the receiver does not possess the above-mentioned winding $b$. Furthermore, the moment taken will be that at which the magnetic field flows in the direction indicated in Fig. 7 by dotted lines. As may be seen from this figure, the field divides in equal parts to the right and left, and there are therefore produced two poles or points of maximum field intensity, e. g. at top and bottom. In other words, the field is such that a conductive on non-polarized magnetic body brought into the field might assume the one or the other of two positions. This alternating field is also indicated in Fig. 3, and the circumstances that the ring $a$ is of U-section and is not ring-wound as in Fig. 7 make no difference in respect to the formation of opposite poles in the ring. As may be seen from Fig. 6, the portions $l, r$ of the halves of the U will be of one pole, and the portions $n, m$ will be of the opposite pole. The coaxially journaled soft-iron rotor $c$ might thus adjust itself with its end $o$ at the portion $r$ of the ring, while the end $u$ is at the portion $n$, or it might so adjust itself that its end $u$ is at the portion $l$ and its end $o$ at the portion $m$. In other words the rotor can settle in two different positions. This difficulty I obviate by means of the auxiliary winding $b$. The latter will produce a field as indicated by the dotted circles in Fig. 6. The two fields will be additive at $r$ and $n$ and subtractive at $l$ and $m$. The resultant field will therefore have only one maximum in either the left or right half of the U-shaped ring. Consequently, the Z-shaped rotor can settle in one position only, namely in the line connecting the two field maxima $r$ and $n$ which are diagonally opposite one another.

Fig. 5 shows various methods of connecting the auxiliary or polarizing coil $b$, and as is evident from this figure one or both sides of the system N are not needed for the receiver when a system of polarizing transmission currents is employed. The term polarizing current is applied to a current which, superposed on or algebraically added to the ordinary transmission currents, distorts the fields in the receiving cores, i. e. modifies the magnetic poles produced by them, in the manner described. For instance, when the windings of the rings or cores are star connected, the polarizing coil $b$ in the receiver E may be connected between the center of the star of the receiver E and one side of the supply system N, while at the same time the other pole of this system may be connected to the center of the star of the sender G. The polarizing coil $b$ may also be divided into three similarly wound coils, each of which is connected in series with a leg of the star winding of the receiver, as shown at E'.

The lower portion of Fig. 5 shows an arrangement in which each component of the polarizing coil is connected in series with a group of receiver coils which are here delta-connected; neither of the poles of the supply system N is here required for the receiver. The letter G here represents the transmitter, and E' the receiver. To each coil of a transmitter G is added a transformer T. This transformer as structurally part of the transmitter G supplies a constant additional voltage and prevents the reversing of phase of the total voltage between the transmitting lines which will occur at a continuous readjustment of the transmitter. In consequence thereof there will not be a reversal of phase in the coils of the receiver. Therefore the total of the currents in the three receiver coils with their auxiliary coils $b$ will no more become equal to 0 but approximately equal to a constant value. The polarizing coil divided into three parts $b$ is, therefore, of exactly the same effect as the single coil $b$ of the receiver E, in the upper right hand corner of Fig. 5, or also equal to the single polarizing coil connected (page 2 line 25) at both ends directly to the system.

My apparatus allows the rotor of the receiver to rotate through the full circle of 360°.

It may here be added that the described apparatus can also be used as a sender. In this case the polarizing winding will be excited by an alternating current. The change in the distribution of the fields and consequently in the voltages in the transmission lines will then be effected by adjusting the movable member or rotor.

I claim:—

1. In electrical transmission apparatus, the combination of an annular core of U-section, each half of the core having an annular pole-face, a soft iron member rotatable about the axis of the core and magnetically connecting each pole-face only with the other pole-face, and alternating-current means comprising a winding located in the groove of said core for producing at each pole-face a field having only one maximum.

2. In electrical transmission apparatus, the combination of an annular core of U-sections, each half of the core having an annular pole-face, a soft-iron member rotatable about the axis of the core and magnetically connecting each pole-face only with the other pole-face, a multiphase winding carried by said core, and a single-phase winding located in the groove of said core.

3. In electrical transmission apparatus, the combination of an annular core of U-section, each half of the core having an annular pole-face, a soft iron member rotatable about the axis of the core and magnetically connecting each pole face only with the other pole-face, a multiphase winding carried by said core, and occupying part of the groove therein, and a single-phase winding located in said groove in the portion thereof more remote from said axis than the portion thereof occupied by part of the said multiphase winding.

In testimony whereof I have signed my name to this specification in the presence of two subscribing witnesses.

ERICH BECKMANN.

Witnesses:
 MARIE RÖSELER,
 GUSTAV BUSSE.